US011506308B2

(12) United States Patent
Legg et al.

(10) Patent No.: US 11,506,308 B2
(45) Date of Patent: Nov. 22, 2022

(54) CLAMPING DEVICE FOR FLEXIBLE PIPE FOR SUBSEA APPLICATIONS, AND RELATED METHOD

(71) Applicant: Baker Hughes Energy Technology UK Limited, Bristol (GB)

(72) Inventors: David Legg, Newcastle upon Tyne (GB); Andrew Powell, Newcastle upon Tyne (GB); Richard David Carverhill, Newcastle upon Tyne (GB)

(73) Assignee: Baker Hughes Energy Technology UK, Bristol (GB)

( * ) Notice: Subject to any disclaimer, the term of this patent is extended or adjusted under 35 U.S.C. 154(b) by 257 days.

(21) Appl. No.: 16/465,308

(22) PCT Filed: Nov. 27, 2017

(86) PCT No.: PCT/GB2017/053548
§ 371 (c)(1),
(2) Date: May 30, 2019

(87) PCT Pub. No.: WO2018/109432
PCT Pub. Date: Jun. 21, 2018

(65) Prior Publication Data
US 2019/0390794 A1    Dec. 26, 2019

(30) Foreign Application Priority Data

Dec. 12, 2016    (GB) ..................... 1621119

(51) Int. Cl.
*F16L 17/04*    (2006.01)
*F16L 3/10*    (2006.01)
(Continued)

(52) U.S. Cl.
CPC ............ *F16L 1/207* (2013.01); *E21B 17/085* (2013.01); *F16L 3/1066* (2013.01)

(58) Field of Classification Search
USPC ....................................... 137/15.08
See application file for complete search history.

(56) References Cited

U.S. PATENT DOCUMENTS 7,384,076 B2 * 6/2008 Bradley ................. F16L 47/12
                                                    285/379
7,568,861 B2 * 8/2009 Godoy .................. E21B 17/017
                                                    405/211

(Continued)

FOREIGN PATENT DOCUMENTS

DE    102008044942 A1    3/2010
EP       3156707 A1    4/2017
(Continued)

OTHER PUBLICATIONS

International Search Report and Written Opinion of the International Searching Authority, dated Feb. 27, 2018, for corresponding International Application No. PCT/GB2017/053548, 15 pages.

(Continued)

*Primary Examiner* — Matthew Troutman
*Assistant Examiner* — Douglas S Wood
(74) *Attorney, Agent, or Firm* — Klarquist Sparkman, LLP

(57) ABSTRACT

The disclosure relates to a clamping device and method of securing a clamping device. The clamping device is suitable for clamping an elongate member, and includes a body portion for surrounding the elongate element and configured to apply a compressive force on the elongate member. The body portion includes at least two outwardly curved plates.

18 Claims, 8 Drawing Sheets

(51) Int. Cl.
*F16L 1/20* (2006.01)
*E21B 17/08* (2006.01)

(56) References Cited

U.S. PATENT DOCUMENTS

| | | | |
|---|---|---|---|
| 8,789,605 B2* | 7/2014 | Sessions | E21B 17/1035 |
| | | | 166/360 |
| 9,163,706 B2* | 10/2015 | Seblante, Sr. | F16H 7/06 |
| 9,163,760 B2* | 10/2015 | Lundstrom | F16L 23/024 |
| 9,377,133 B2* | 6/2016 | Pionetti | F16L 57/02 |
| 2012/0061076 A1 | 3/2012 | McDaniel et al. | |

FOREIGN PATENT DOCUMENTS

| | | | | | |
|---|---|---|---|---|---|
| FR | 2441079 A1 | | 6/1980 | | |
| FR | 2878930 A1 | | 6/2006 | | |
| GB | 685081 A | | 12/1952 | | |
| GB | 2322406 A | * | 8/1998 | | E21B 17/012 |
| GB | 2322406 A | | 8/1998 | | |
| GB | 2453567 A | | 4/2009 | | |
| JP | 2001065516 A | | 3/2001 | | |

OTHER PUBLICATIONS

Office Action from China National Intellectual Property Administration (CNIPA), for Chinese Patent Application No. 201780076607.X, dated Sep. 1, 2020, 8 pages.

Search Report from the United Kingdom Intellectual Property Office for United Kingdom Application No. GB 1621119.5, dated Jun. 9, 2017, 3 pages.

* cited by examiner

CLAMPING DEVICE FOR FLEXIBLE PIPE FOR SUBSEA APPLICATIONS, AND RELATED METHOD

CROSS REFERENCE TO RELATED APPLICATIONS

This is the U.S. National Stage of International Application No. PCT/GB2017/053548, filed Nov. 27, 2017, which in turn claims the benefit of and priority to United Kingdom Patent Application No. GB1621119.5, filed Dec. 12, 2016.

FIELD

The present invention relates to a device and method. In particular, but not exclusively, the present invention relates to a device for clamping an elongate member and method of producing the same.

BACKGROUND

Traditionally flexible pipe is utilised to transport production fluids, such as oil and/or gas and/or water, from one location to another. Flexible pipe is particularly useful in connecting a sub-sea location (which may be deep underwater) to a sea level location.

The pipe may have an internal diameter of typically up to around 0.6 metres (e.g. diameters may range from 0.05 m up to 0.6 m). Flexible pipe is generally formed as an assembly of a flexible pipe body and one or more end fittings. The pipe body is typically formed as a combination of layered materials that form a pressure-containing conduit. The pipe structure allows large deflections without causing bending stresses that impair the pipe's functionality over its lifetime. The pipe body is generally built up as a combined structure including polymer, and/or metallic, and/or composite layers. For example, a pipe body may include polymer and metal layers, or polymer and composite layers, or polymer, metal and composite layers.

In many known flexible pipe designs the pipe body includes one or more pressure armour layers. The primary load on such layers is formed from radial forces. Pressure armour layers often have a specific cross section profile to interlock so as to be able to maintain and absorb radial forces resulting from outer or inner pressure on the pipe. The cross sectional profile of the wound wires which thus prevent the pipe from collapsing or bursting as a result of pressure are sometimes called pressure-resistant profiles. When pressure armour layers are formed from helically wound wires forming hoop components, the radial forces from outer or inner pressure on the pipe cause the hoop components to expand or contract, putting a tensile load on the wires.

In many known flexible pipe designs the pipe body includes one or more tensile armour layers. The primary loading on such a layer is tension. In high pressure applications, such as in deep and ultra deep water environments, the tensile armour layer experiences high tension loads from a combination of the internal pressure end cap load and the self-supported weight of the flexible pipe. This can cause failure in the flexible pipe since such conditions are experienced over prolonged periods of time.

Unbonded flexible pipe has been used for deep water (less than 3,300 feet (1,005.84 metres)) and ultra deep water (greater than 3,300 feet) developments. It is the increasing demand for oil which is causing exploration to occur at greater and greater depths where environmental factors are more extreme. For example in such deep and ultra-deep water environments ocean floor temperature increases the risk of production fluids cooling to a temperature that may lead to pipe blockage. Increased depths also increase the pressure associated with the environment in which the flexible pipe must operate. For example, a flexible pipe may be required to operate with external pressures ranging from 0.1 MPa to 30 MPa acting on the pipe. Equally, transporting oil, gas or water may well give rise to high pressures acting on the flexible pipe from within, for example with internal pressures ranging from zero to 140 MPa from bore fluid acting on the pipe. As a result the need for high levels of performance from the layers of the flexible pipe body is increased.

Flexible pipe may also be used for shallow water applications (for example less than around 500 metres depth) or even for shore (overland) applications.

It is often necessary to clamp a section of a flexible pipe to limit axial movement of the flexible pipe, for example when tethering the flexible pipe to a fixed sub-sea structure. In such applications, a clamping device is clamped to the flexible pipe to surround and hold the flexible pipe. A tethering element, for example a chain or rope, connects the clamping device to the fixed structure, which may be a gravity base or the sea-bed, for example.

Flexible pipes for sub-sea applications are generally compressible to some extent. As such, when used in deep water applications the flexible pipes may be subject to hydrostatic pressure sufficient to cause a change in diameter of the flexible pipe.

Typical clamping assemblies include an inner shell arranged around the flexible pipe and an outer jacket arranged around the inner shell. Sections of the outer jacket are brought together via connectors, for example bolts or fasteners, such that the outer jacket provides a clamping force on the flexible pipe via the inner shell. Other typical clamping assemblies also include spring elements to bias the inner shell against the flexible pipe when the sections of the outer jacket are brought together.

Typical clamping assemblies are pre-tensioned by sequentially tensioning bolts around the circumference and/or length of the clamping assembly, multiple times until the desired compressive force is achieved over the desired length of the clamping assembly.

U.S. Pat. No. 8,562,029 B2 discloses a clamp for mounting upon a cylindrical member, such as a sub-sea riser or umbilical, having a set of outer clamp shells shaped to be arranged around the cylindrical member, and adapted to be secured to one another by bolts. Within the structure are inner clamp members shaped to seat upon the cylindrical member, e.g. through part-circular inner faces. The inner clamp members are biased into engagement with the cylindrical member by spring elements pre-stressed upon assembly of the clamp between opposed surfaces of the respective outer clamp shell and inner clamp member.

SUMMARY

According to a first aspect of the present invention there is provided a clamping device for clamping an elongate member, the clamping device comprising a body portion for surrounding the elongate element and configured to apply a compressive force on the elongate member, wherein the body portion comprises at least two outwardly curved plates.

According to a second aspect of the present invention there is provided a method of assembling a clamping device for clamping an elongate member, comprising the steps of surrounding the elongate element with a body portion for applying a compressive force on the elongate member, wherein the body portion comprises at least two outwardly curved plates; and tightening the at least two outwardly curved plates against the elongate member.

Certain embodiments of the invention provide a clamping device and method that constrains an elongate element to prevent axial movement.

Certain embodiments provide the advantage that a compressive clamping force can be maintained on an elongate element despite a reduction in diameter of the elongate element.

Certain embodiments provide the advantage that the amount of components required is reduced compared to known clamping devices.

Certain embodiments provide the advantage that the clamping device is cheaper, and quicker and easier to install, compared to known arrangements.

BRIEF DESCRIPTION OF THE DRAWINGS

Embodiments of the invention are further described hereinafter with reference to the accompanying drawings, in which.

DETAILED DESCRIPTION

Figure 1:
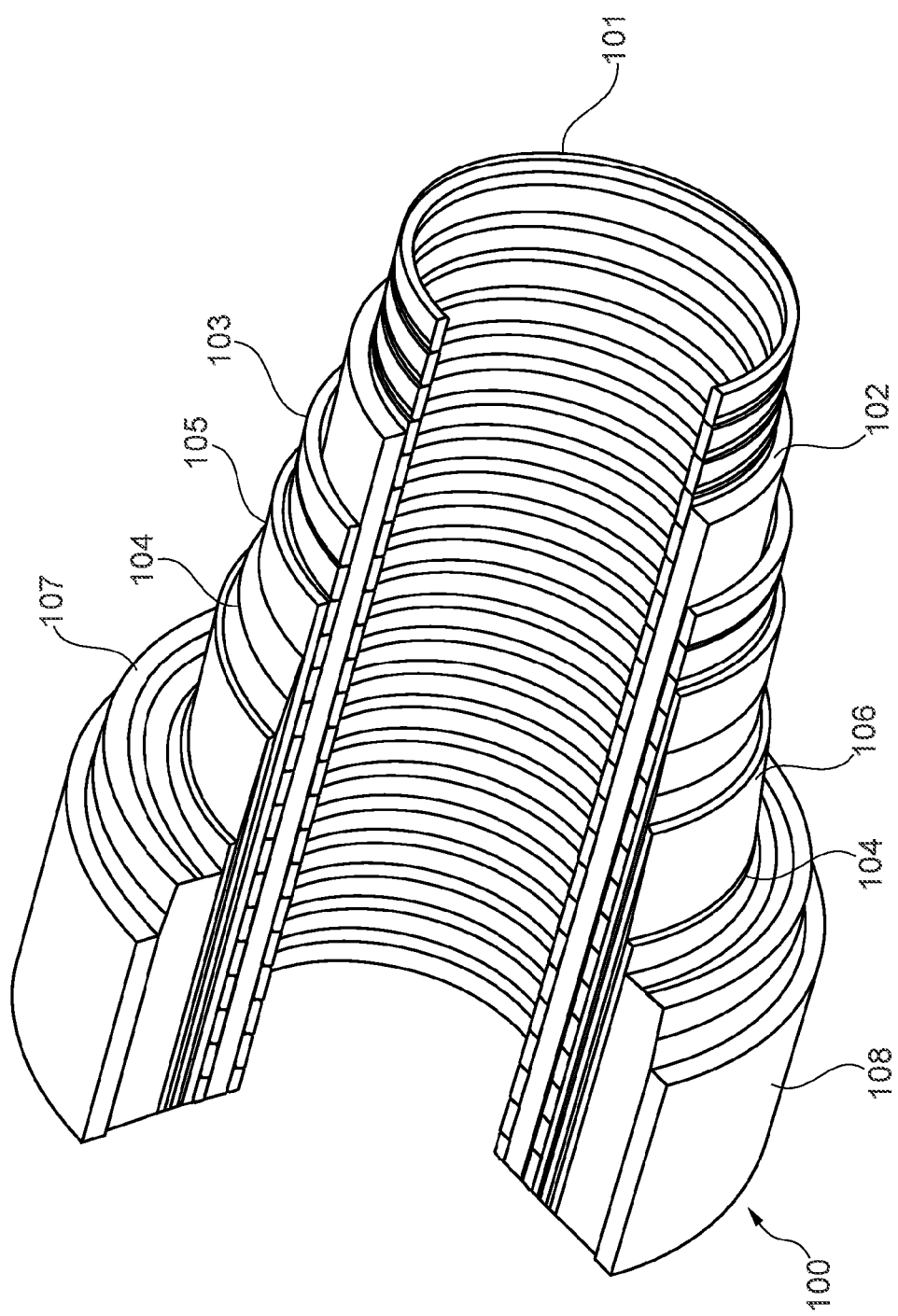
FIG. 1 illustrates a flexible pipe body.

In the drawings like reference numerals refer to like parts.

Throughout this description, reference will be made to a flexible pipe. It will be understood that a flexible pipe is an assembly of a portion of pipe body and one or more end fittings in each of which a respective end of the pipe body is terminated. FIG. 1 illustrates how pipe body 100 is formed in accordance with an embodiment of the present invention from a combination of layered materials that form a pressure-containing conduit. Although a number of particular layers are illustrated in FIG. 1, it is to be understood that the present invention is broadly applicable to coaxial pipe body structures including two or more layers manufactured from a variety of possible materials. For example, the pipe body may be formed from polymer layers, metallic layers, composite layers, or a combination of different materials. It is to be further noted that the layer thicknesses are shown for illustrative purposes only. As used herein, the term "composite" is used to broadly refer to a material that is formed from two or more different materials, for example a material formed from a matrix material and reinforcement fibres.

As illustrated in FIG. 1, a pipe body includes an optional innermost carcass layer 101. The carcass provides an interlocked construction that can be used as the innermost layer to prevent, totally or partially, collapse of an internal pressure sheath 102 due to pipe decompression, external pressure, and tensile armour pressure and mechanical crushing loads. The carcass layer is often a metallic layer, formed from stainless steel, for example. The carcass layer could also be formed from composite, polymer, or other material, or a combination of materials. It will be appreciated that certain embodiments of the present invention are applicable to 'smooth bore' operations (i.e. without a carcass layer) as well as such 'rough bore' applications (with a carcass layer).

The internal pressure sheath 102 acts as a fluid retaining layer and comprises a polymer layer that ensures internal fluid integrity. It is to be understood that this layer may itself comprise a number of sub-layers. It will be appreciated that when the optional carcass layer is utilised the internal pressure sheath is often referred to by those skilled in the art as a barrier layer. In operation without such a carcass (so-called smooth bore operation) the internal pressure sheath may be referred to as a liner.

An optional pressure armour layer 103 is a structural layer that increases the resistance of the flexible pipe to internal and external pressure and mechanical crushing loads. The layer also structurally supports the internal pressure sheath, and typically may be formed from an interlocked construction of wires wound with a lay angle close to 90°. The pressure armour layer is often a metallic layer, formed from carbon steel, for example. The pressure armour layer could also be formed from composite, polymer, or other material, or a combination of materials.

The flexible pipe body also includes an optional first tensile armour layer 105 and optional second tensile armour layer 106. Each tensile armour layer is used to sustain tensile loads and internal pressure. The tensile armour layer is often formed from a plurality of wires (to impart strength to the layer) that are located over an inner layer and are helically wound along the length of the pipe at a lay angle typically between about 10° to 55°. The tensile armour layers are often counter-wound in pairs. The tensile armour layers are often metallic layers, formed from carbon steel, for example. The tensile armour layers could also be formed from composite, polymer, or other material, or a combination of materials.

The flexible pipe body shown also includes optional layers of tape 104 which help contain underlying layers and to some extent prevent abrasion between adjacent layers. The tape layer may be a polymer or composite or a combination of materials.

The flexible pipe body also typically includes optional layers of insulation 107 and an outer sheath 108, which comprises a polymer layer used to protect the pipe against penetration of seawater and other external environments, corrosion, abrasion and mechanical damage.

Each flexible pipe comprises at least one portion, sometimes referred to as a segment or section of pipe body 100 together with an end fitting located at at least one end of the flexible pipe. An end fitting provides a mechanical device which forms the transition between the flexible pipe body and a connector. The different pipe layers as shown, for example, in FIG. 1 are terminated in the end fitting in such a way as to transfer the load between the flexible pipe and the connector.

Figure 2:
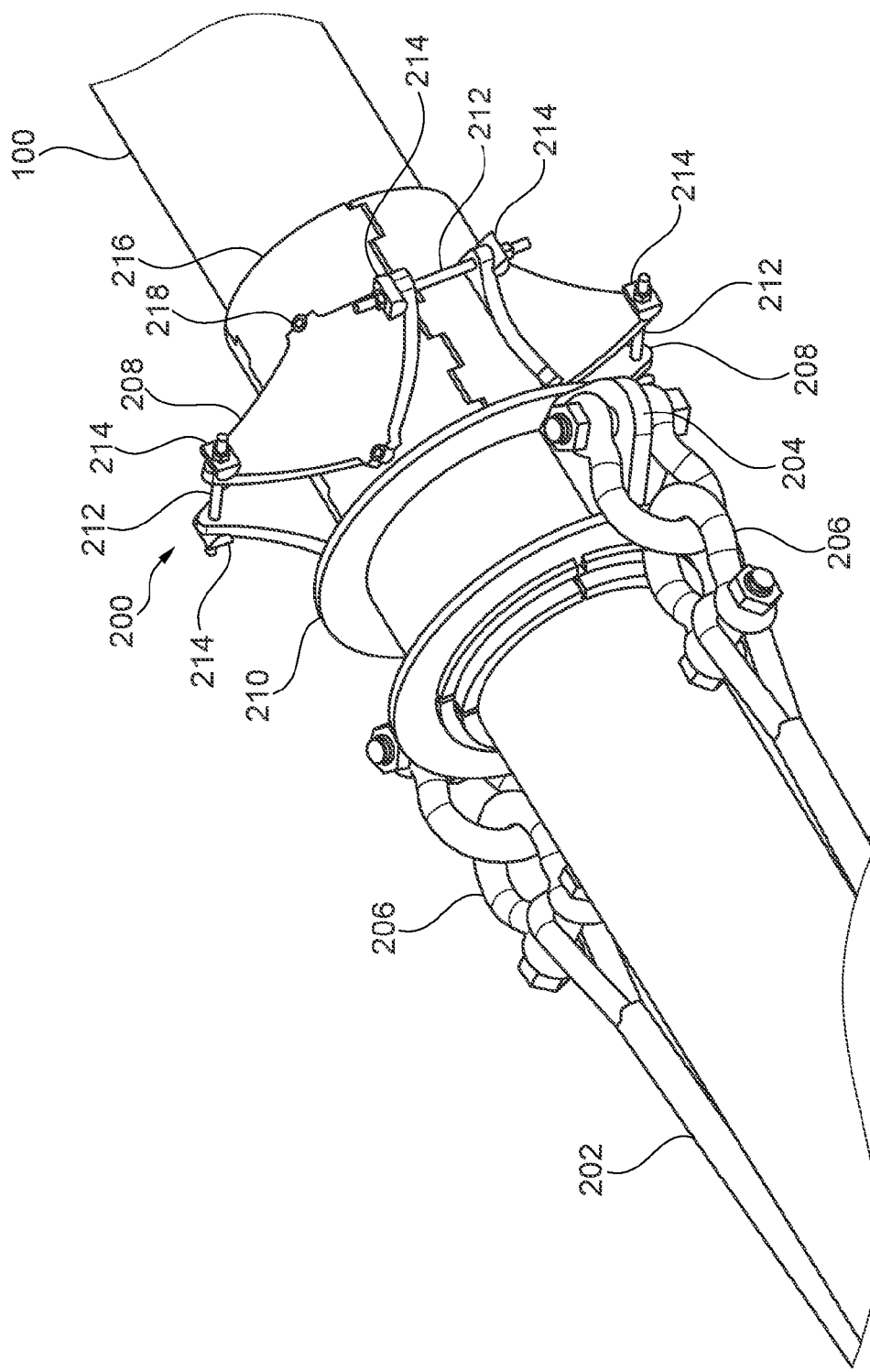
FIG. 2 illustrates a clamping device, clamped to a flexible pipe.

FIG. 2 illustrates a first embodiment of a clamping device 200 for clamping an elongate member, e.g. a flexible pipe for a subsea riser or umbilical. In this embodiment the elongate member is a pipe body 100.

The clamping device 200 includes a body portion for surrounding the pipe body 100. The body portion is configured to apply a compressive force on the pipe body. The body portion includes at least two outwardly curved plates 208. In this embodiment the clamping device 200 includes four outwardly curved plates 208.

The outwardly curved plates are manufactured from a compliant/high yielding material. For example, in this embodiment the outwardly curved plates are manufactured from high yield carbon steel. Another example of a compliant structural material is S690 steel, although any suitable material may be used, for instance API 5L grade X52 or X60 pipe material. A suitable material should have a consistent strength, low creep and linear elastic properties, so that the outwardly curved plates may predictably bend, according to their geometry and material properties, when a force is applied to them, and be of sufficiently high ductility so that they will not plastically deform nor fracture in a brittle manner if over-stressed.

The clamping device 200 is mounted on the pipe body 100. In this embodiment the clamping device is tethered to a fixed structure (not shown) via tethering elements 202. The tethering elements 202 are flexible filaments, e.g. 2 pieces of rope, and the fixed structure is an anchoring base on the sea floor.

The tethering elements 202 are connected to respective flanges 204 located on a sleeve portion 210 of the clamping device via two bolted D-rings 206. The bolted D-rings allow the tethers to rotate relative to the pipe body 100.

The sleeve portion 210 is provided in a plurality of connectible sections (not shown in figures for simplicity) which may be fastened around the rest of the clamping device. The axial position of the sleeve portion with respect to the rest of the clamping device is maintained via a lip on the ends of the inner plate members 216, through which the opposing axial forces from the tethers and the pipe can be transmitted. The sleeve portion is rotatable around the rest of the clamping device. A suitable solid bearing material (for instance a composite comprising PTFE, or another suitably low friction material) may be applied between the inner surfaces of the rotating sections of the sleeve portion 210 and the outer surfaces of the inner plate members 216, to ensure ease of rotation of the sleeve portion.

Each of the outwardly curved plates 208 is connected to adjacent plates. That is, each of the outwardly curved plates 208 is connected to two circumferentially adjacent plates. The outwardly curved plates 208 are connected to adjacent plates via connecting elements 212. In this embodiment the connecting elements are bolts, tensioned via a fastening assembly 214, located at each end of the bolt. In this embodiment the fastening assembly is a screw and a half round washer.

The outward curvatures of plates 208 are reduced by tensioning at least one of the connecting elements 212 connecting each of the outwardly curved plates to adjacent outwardly curved plates. That is, the connecting elements/bolts 212 are tensioned to pre-stress the outwardly curved plates 208.

To tension the connection element, the screws of the fastening assemblies are screwed towards each other along the bolt, i.e. towards the centre of the bolt. As the screws of the fastening assemblies are screwed towards the centre of the bolt, the curvature of the outwardly curved plates is reduced by the screws. The outwardly curved plates 208 are pre-stressed due to the change in their respective curvatures, i.e. the outward curvature of the outwardly curved plates 208 is reduced, resulting in the plates being pre-stressed.

In this embodiment, the clamping device also includes a radially inner portion. The radially inner portion includes at least two inner plate members 216, which in this embodiment is four inner plates members 216. In this embodiment the inner plate members are manufactured from S355 steel, although any suitable structural material may be used (for example alternative steel material could be API 5L X52 pipe steel, or a non-metallic material could be a moulded composite material, for instance an epoxy resin material reinforced with either glass or carbon fibres).

The inner plate members 216 are located radially inwardly of the body portion, i.e. radially between the body portion and the pipe body 100. The radially inner portion and the pipe body prevent the tensioned outwardly curved plates from returning to their original curvature, i.e. the initial unstressed position. The outwardly curved plates therefore apply a force on the radially inner portion. That is, the body portion applies a compressive force on the elongate member/pipe body via the radially inner portion.

Each inner plate member extends at least partly around the circumference of the pipe body 100. In this embodiment each of the four inner plate members extends substantially 25% around the circumference of the pipe body 100.

The inner plate members 216 surround the pipe body 100, with some space left between adjacent inner plate members to accommodate a change in diameter of the pipe body 100. For example, the diameter of the pipe may decrease between 1% and 12% depending on the initial diameter of the pipe. The inner plate members include a teeth arrangement that extends along the axial edge of each inner plate members to allow the inner plates to axially inter-lock.

Each of the outwardly curved plates is connected to one of the inner plate members. In this embodiment, each of the four plates are each connected to a separate inner plate member. In this embodiment the plates are bolted onto the respective inner plates using a bolt 218. Alternative connection means is also possible (for example the outwardly curved plates may be welded to the inner plate members).

Figure 3:
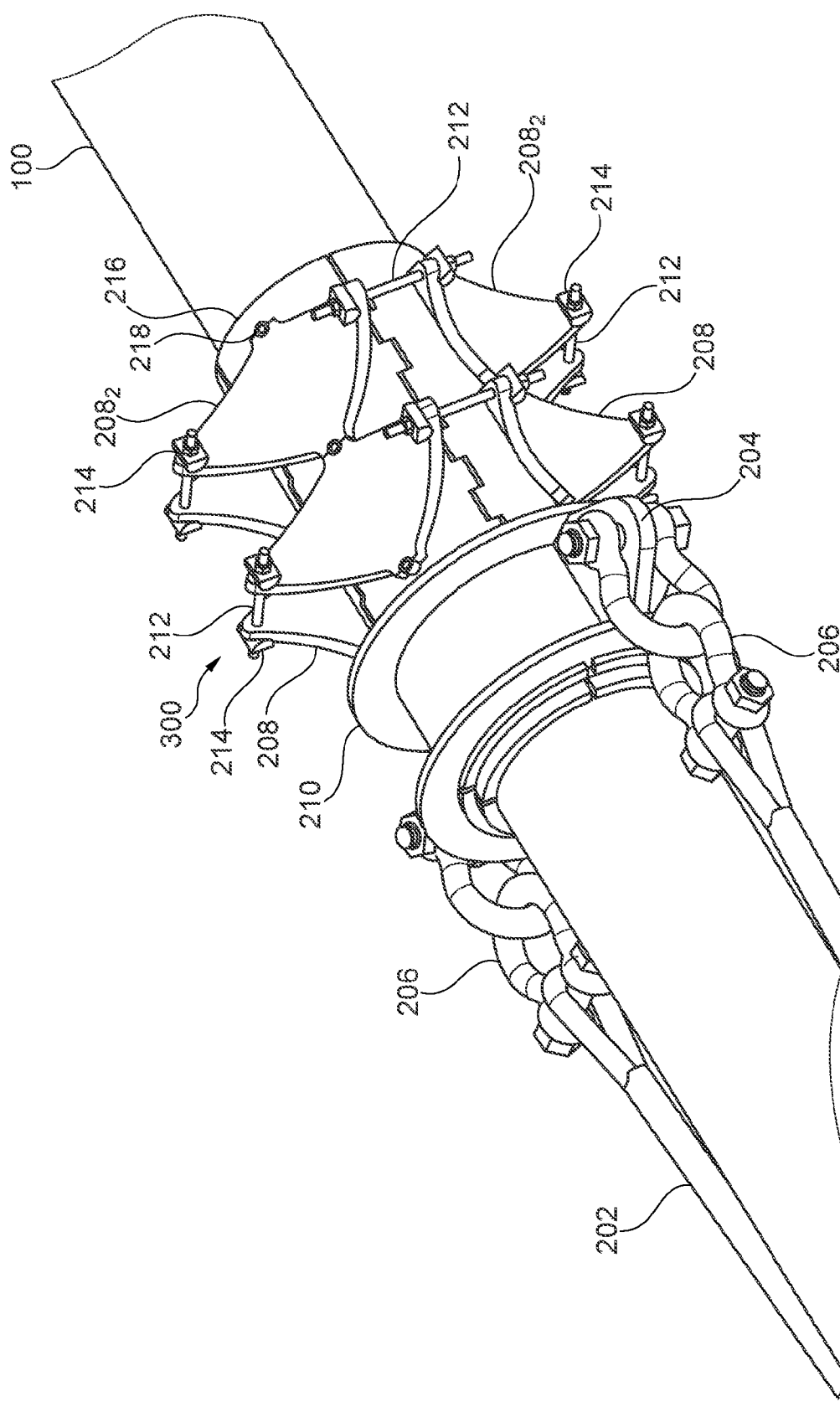
FIG. 3 illustrates another clamping device, clamped to a flexible pipe.

FIG. 3 illustrates a second embodiment of the clamping device. The clamping device 300 is similar to that shown in the first embodiment, but differs in that the body portion comprises an additional four plates $208_2$, located axially offset along the length of the pipe body 100 from the four plates 208 (as shown in FIG. 2). Each of the additional four plates $208_2$ is connected to the same inner plate element as a corresponding plate 208, i.e. the plate from which it is axially offset.

Each of the additional four plates $208_2$ is connected to a corresponding plate 208. In this embodiment, each of the additional four plates $208_2$ is connected to a corresponding plate 208 via bolt 218. Alternatively, the additional plates $208_2$ may not be directly connected to the corresponding plates 208.

Figure 4:
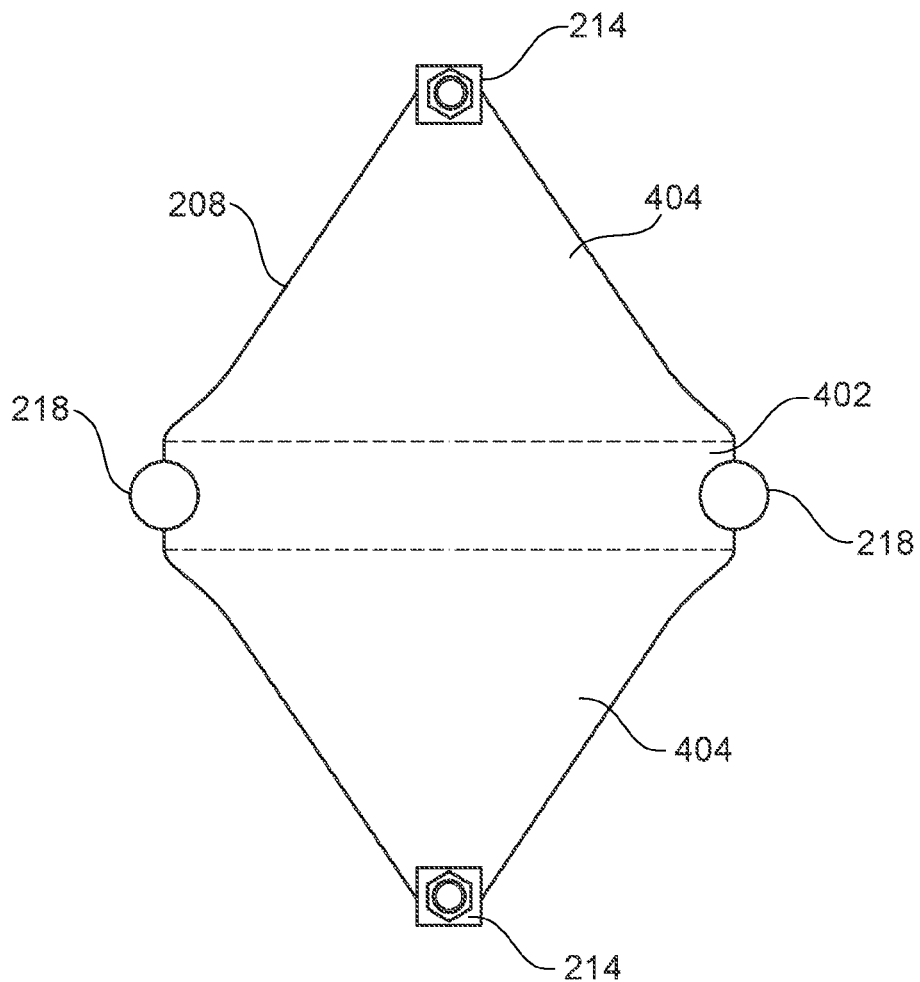
FIG. 4 illustrates a plan view of an outwardly curved plate.

As shown in both FIGS. 2 and 3, each of the outwardly curved plates (including the additional plates of FIG. 3) has a substantially rhombic or diamond shaped profile. FIG. 4 illustrates the rhombic profile of the outwardly curved plates 208 or $208_2$ of the first and second embodiments as viewed from a radially outwardly position. That is, each of the outwardly curved plates includes a central portion 402, configured to extend axially along the pipe body; and two wing portions 404 configured to extend partially circumferentially around the elongate member from the central portion. Each of the wing portions 404 of FIG. 4 are tapered, and generally triangular, such that the width of the wing portion decreases as the wing portions extend away from the central portion 402.

In the first embodiment, the clamping device is assembled by attaching each plate to a respective inner plate member to form a segment of the clamping device. The segments are then arranged around the pipe body 100 and the outwardly curved plates are pre-stressed. The connectible sections of the sleeve portion 210 are then arranged around the rest of the clamping device and then clamped together.

In the second embodiment, the clamping device is assembled in the same manner of the clamping device of the first embodiment, apart from each segment being formed by connecting an outwardly curve plate 208 and an axially offset additional outwardly curved plate 2082 to each inner plate member. That is, a segment includes an inner plate member, an outwardly curved plate and an axially offset additional outwardly curved plate. The outwardly curved plate 208, additional outwardly curved plate 2082, inner plate member 216 and bolt 218 of each segment may be pre-assembled together per segment onshore or prior to offshore deployment.

Figure 5A:
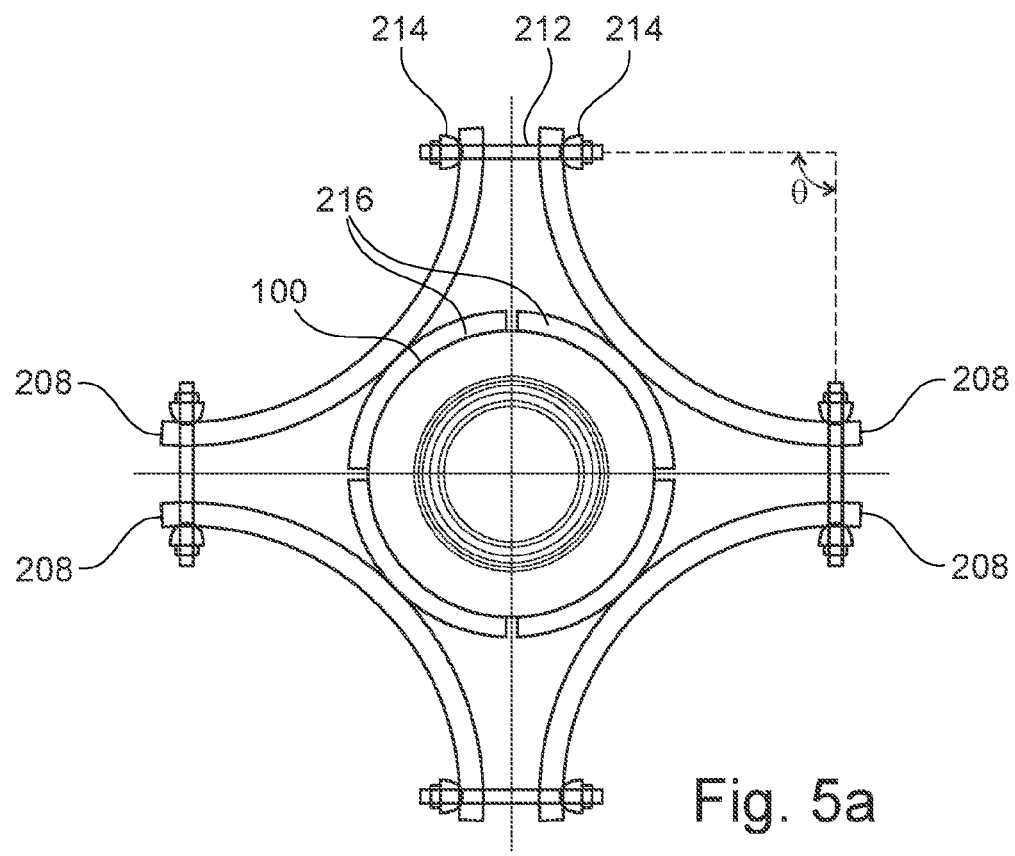
FIG. 5a illustrates a cross-section of the clamping device of FIG. 2 or FIG. 3.
Figure 5B:
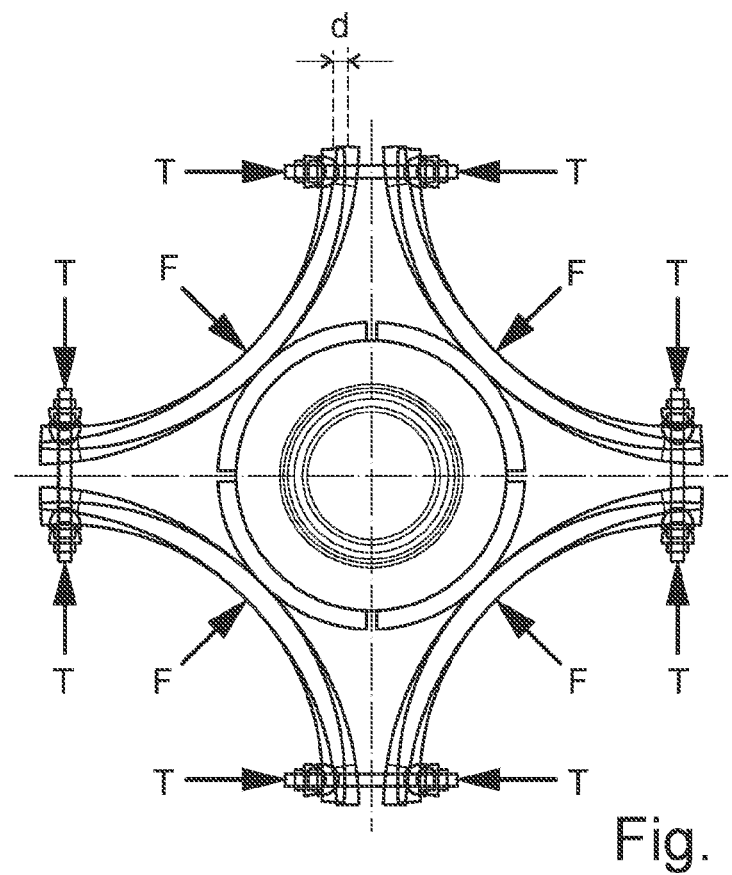
FIG. 5b illustrates a cross-section of the clamping device of FIG. 2 or FIG. 3 before and after tensioning.

Once the clamping device 200, 300 is assembled around the pipe body 100, the connecting elements 212 are tensioned (i.e. the four connecting elements 212). FIGS. 5*a* and 5*b* illustrate a cross-section of the clamping device 200, 300 of the first or second embodiment, before and after tensioning of connecting elements 212, respectively.

The plates 208 are initially outwardly curved as shown in FIG. 5*a*. The angle of curvature θ is substantially 90 degrees for each outwardly curved plate. The outwardly curved plates are then tensioned by tightening the screws of the fastening assembly 214. The angle of curvature will depend on the amount of outwardly curved plates arranged around the pipe circumference. For example, if there were three outwardly curved plates arranged around the pipe the angle of curvature would be substantially 120 degrees.

A tensioning force T is applied to the ends of the wing portions 404 of each plate by displacing the ends of the wing portion by a distance d. In this embodiment the distance d is 10 mm for a 600 mm diameter pipe.

The reduction in curvature of the outwardly curved plates, which results from the displacing of the ends of the wing portion, allows the outwardly curved plates to apply a compressive force F on the pipe body 100. In this embodiment the compressive force F is applied to the pipe body via the inner plate members 216. The compressive force F is applied substantially linearly to the pipe as a result of the degree of bending of the outwardly curved plates. The force F is also substantially uniformly distributed around the circumference of the pipe by the stiff material and structural properties of the inner plate members 216. The inner portion will be relatively stiff in comparison with the pipe structure, applying a relatively circumferentially uniform pressure to the pipe regardless of the clamping force.

The tapered wing portions allow the bending stress to remain relatively constant along the profile of the wing portion as the curvature of the respective outwardly curved plate is changed. This reduces stress concentrations, which may lead to failure.

In operation, the pipe body 100 may be subject to considerable hydrostatic pressure, which may result in a change in diameter of the pipe body. The outwardly curved plates are pre-stressed, such that a compressive force will be maintained from the outwardly curved plates to the pipe body 100 in the event of a reduction in diameter of the pipe body.

That is, in the event of a reduction in diameter of the pipe body 100, the curvature of the outwardly curved plate will increase, but it will remain pre-stressed (i.e. the curvature will not be reduced to its unstressed configuration), such that the compressive force from the outwardly curved plates to the pipe body 100 will be maintained.

For example, for a reduction in diameter of 5 mm, a pre-tensioning displacement of 12 mm (dependent on load capacity) may be sufficient for the clamping device to maintain a compressive force on the pipe body. It will be understood however that the diameter reduction is entirely dependent on the structure of the pipe body onto which the clamp device is attached, and the materials it comprises.

The circumferential space between inner plate members allows the clamping device to accommodate a change in diameter of the pipe body. As the pipe diameter reduces, the space between the inner plate members also reduces.

A method is provided herein for assembling a clamp device for clamping a pipe body, including surrounding the pipe body with a body portion for applying a compressive force on the pipe body. The body portion comprises at least two outwardly curved plates. Each of the at least two plates is connected to at least one adjacent plate. The method further includes the step of tightening the at least two outwardly curved plates against the elongate member.

Various modifications to the detailed arrangements as described above are possible. For example, although the first embodiment describes a clamping device for a flexible pipe for production fluids, the clamping device may be used for any flexible pipe, which undergoes a change in diameter. For example, the clamping device may be used for clamping an umbilical or a water injection line.

FIG. 2 illustrates a clamping device with a single 'axial layer' of plates, i.e. a number of plates (in this case four) which are connected such that they extend around the entire circumference of the pipe body 100. FIG. 3 illustrates a clamping device with two rows or 'axial layers' of plates, i.e. a row of plates 208 and an axially offset row of additional plates 208$_2$. In practice there may be as many rows of plates as required for specific applications, with an increased clamping force being produced from an increased number of layers.

Figure 6:
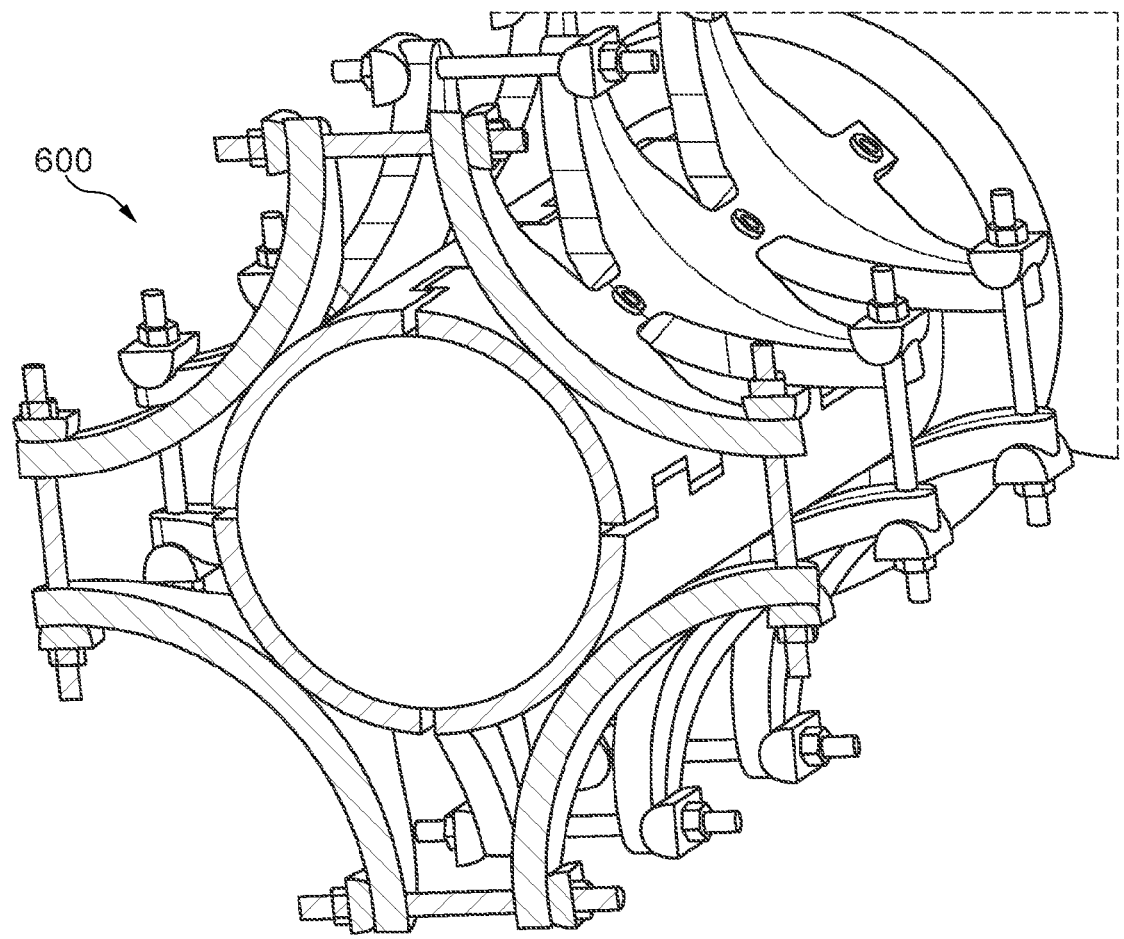
FIG. 6 illustrates a cut-away view of another clamping device.

FIG. 6 illustrates a cutaway perspective view of a clamping device with three rows of plates, with the cutaway section being taken through the first of the three rows.

Figure 7:
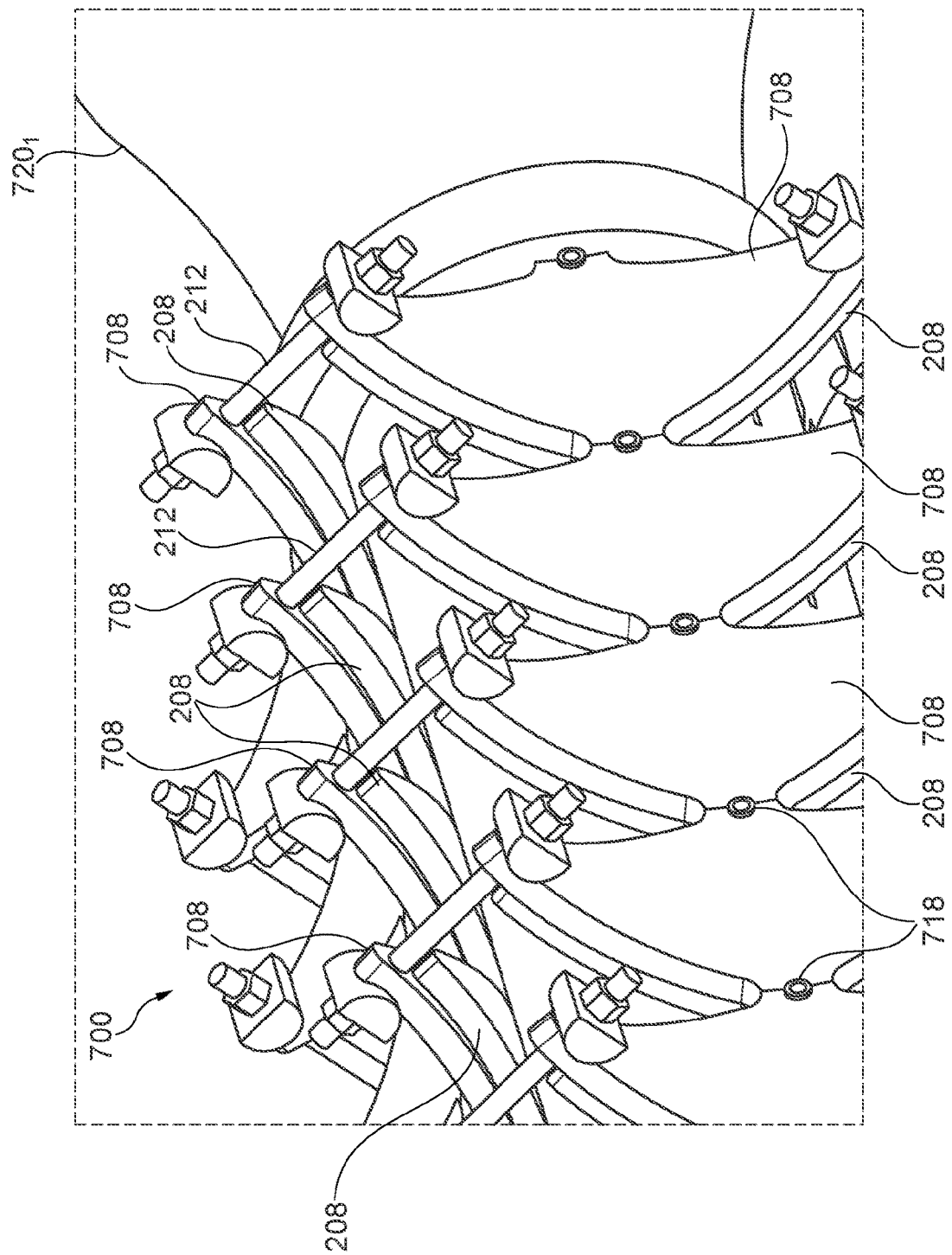
FIG. 7 illustrates a clamping device with a double plate configuration.
Figure 8:
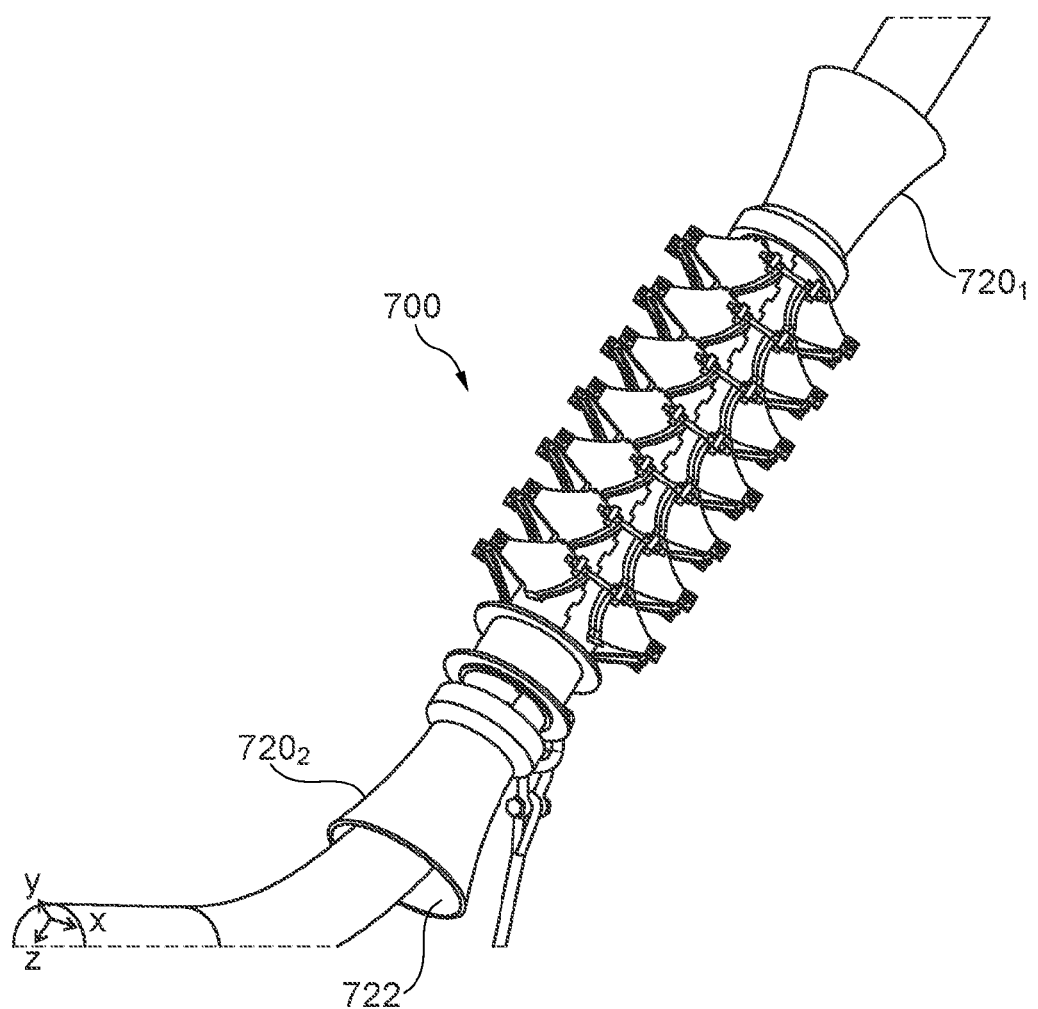
FIG. 8 provides another view of the clamping device of FIG. 7.

FIGS. 7 and 8 illustrate a third embodiment of the invention, whereby the clamping device further includes support plates 708 located radially outwardly of the plates 208 as described in previous embodiments. That is, a third embodiment of the clamping device includes at least two outwardly curved support plates 708, located radially outwardly from the at least two plates 208.

The support plates are connected to the radially inward plates 208 and the inner plate members via bolts 718. The support plates are connected via connecting elements 212 and are tensioned in the same manner in previous embodiments. Tensioning the connecting element reduces the outward curvature of the support plates. As the support plates 708 are situated radially outwardly of the plates 208 and the support plates may allow the same displacement, the plates 208 and support plates 708 together will be stressed similarly for a given strain but will support an increased load, thus increasing the clamping force and therefore the clamp capacity (this in turn may allow a clamp to be designed with fewer segments). It can be understood that as the connecting elements 212 are tensioned and the outwardly curved plates have their curvature reduced, there may be increasing resistance to that force from the connecting elements (dependent upon the strength and thickness of the plates 208 and support plates 708).

In this embodiment the clamping device 700 further includes two bend limiters 720$_{1,2}$, located at each end of the clamping device. Each bend limiter 720$_{1,2}$ includes a channel 722, within which the pipe body is situated. The channel 722 may have a bell-mouth profile so that as the pipe body exits the channel, the curvature of the pipe body is limited as it exits the clamping device. As such, the pipe body is prevented from overbending, for example as a result of strong currents. Depending on the forces and resulting movements predicted for the installed pipe system (from the global analysis performed), the materials may be selected appropriately from polymer, for instance polyurethane or polyamide, steel or composite, or a combination of these. The bend limiters may also be replaced by other known pipe bend limiting systems, such as conical bend stiffeners, or a plurality of bend restrictor half-shell elements connected from the clamp and around the flexible pipe (as will be familiar to someone skilled in the art from the industry specification API 17B).

As discussed with regards to the previous embodiments, there may be any number of rows of plates extending axially along the pipe body.

In the above described embodiments, the clamping device is tethered to an anchoring base on the sea floor by flexible filaments. Any suitable tethering element may be used, for example the tethering elements may be chains, ropes, biasing elements, springs or the like. Furthermore the clamping device may be tethered to any fixed structure. For example, the clamping device may be tethered to an anchor element or a mid-water arch. Alternatively the clamping device may be tethered to a moving structure, for example a floating facility, a buoyancy element or a ballast element.

In the above described embodiments, each outwardly curved plate is connected to adjacent outwardly curved plates. That is, each plate is connected to two circumferentially adjacent outwardly curved plates, however other numbers of connections are possible depending on the clamping force requirements of the clamping device. For example, each outwardly curved plate may be connected to just one adjacent outwardly curved plate. Moreover, the number of connections does not have to be equal for all outwardly curved plates. For example one outwardly curved plate may be connected to a single adjacent outwardly curved plate, whereas another outwardly curved plate may be connected to more than one adjacent outwardly curved plate.

In the above described embodiments, the connecting elements are screws tensioned by bolts, however any suitable connecting element may be used. For example the connecting element may be a spring.

In the above described embodiments, there are four outwardly curved plates arranged circumferentially around the pipe body. However, any suitable number of plates may be used. For example, there may be two, three or five outwardly curved plates. A skilled person may select the number of plates depending on the required compressive load from the clamping device, the outward curvature of the plates and the diameter of the pipe body relative to the size of the plates.

In the above described embodiments, each outwardly curved plate is connected to a separate inner plate member, i.e. there is only one outwardly curved plate attached to each inner plate member. However, there may be more than one outwardly curved plate connected to each inner plate member, e.g. there may be two outwardly curved plates connected to each inner plate member, such that there are twice as many outwardly curved plates as there are inner plate members.

In the above described embodiments inner plate members may be replaced with polyurethane shoes, which are fitted to the inside diameter of the outwardly curved plates to act on the outside diameter of the flexible pipe body.

In the second embodiment, each of the at least two further outwardly curved plates 2082, is connected to one of the at least two outwardly curved plates 208. However, each of the at least two further outwardly curved plates 2082 may be integral with one of the at least two outwardly curved plates 208. That is, each of the additional four plates 2082 is integral with a corresponding outwardly curved plate 208.

In the second embodiment a segment includes an inner plate member, an outwardly curved plate and an axially offset additional outwardly curved plate. However, the axially offset additional outwardly curved plate may instead be attached to an axially offset additional inner plate member. That is, there may be a plurality of independent segments arranged axially along the pipe body, in addition to circumferentially around the pipe body.

In such an arrangement the segments may be connected with a tie element, or a plurality of tie elements. A tie element may comprise a metallic plate or strip, or a chain link, bolted or otherwise connected to the clamping device using, for instance, D-rings and shackles. The tie element may determine the axial position of each segment of clamping device.

In the above described embodiments, each of the at least two outwardly curved plates, is of substantially rhombic profile, including a central portion 402, configured to extend axially along the elongate member; and two wing portions 404 configured to extend partially circumferentially around the elongate member from the central portion. However, each plate can be of any suitable shape. For example, each outwardly curved plate may have any number of wing portions. That is, each of the plates includes at least one wing portion configured to extend partially circumferentially around the elongate member from the central portion.

For example, each outwardly curved plate may have only one wing portion. As such, the outwardly curved plate would have a substantially triangular profile.

In the above described embodiments each of the wing portions 404 are tapered, such that the width of the wing portion decreases as the wing portions extend circumferentially from the central portion 402. However, the wing portions may not be tapered. For example, each outwardly curved plate could be of a rectangular profile.

In the above described embodiments each of the wing portions extends either side of the central portion. However, there may be more than one wing portion extending from a side of the central portion, such that the plate has a substantially V-, X- or H-shaped profile.

The displacement d of the end of each outwardly curved plate can be any distance, which creates the suitable amount of tensioning force T. Typically, the value of d may be between 5 mm and 15 mm. Typically values of d may be between 5 mm and 10 mm but the value will be dependent upon sizes and load requirements.

The tensioning force and the resultant compressive force F will vary depending on numerous factors, including the exact size and curvature of the outwardly curved plates and the distance through, which the fastening assembly 214 is tensioned.

For example the clamping device may have a clamping capacity of 15 tonnes (based on a friction coefficient of 0.1). The clamping device may have a tensioning capacity of 100 kN-600 kN on the pipe, and consequently require a clamping force of 10 times the tensioning capacity based on, for instance, a friction coefficient of 0.1 between the clamping device and the pipe body (i.e. the clamping force may need to be 1000-6000 kN).

In the above described embodiments, segments of the clamping device are pre-assembled before being constructed around the pipe body. However, the inner plate members may be assembled around the pipe body prior to the outwardly curved plates being connected to respective inner plate members.

The body portion may be constructed as a single component. That is, the outwardly curved plates of the body portion may not be separate entities but may be integral.

The axial length of each plate may be of any dimension according to the specific application. For example, the axial length of each plate may be less than the diameter of the pipe body. Alternatively, the axial length of each plate may be more than the diameter of the pipe body.

In the above described embodiments the clamping device is tethered to another structure, for example an anchor. The tether acts to restrain the clamping device in tension, limiting movement of the clamped section of pipe body. However the clamping device, and hence clamped section of pipe body, may instead be held in position by a compression type support. In such a configuration the clamping device abuts the compression type support and restrains the clamping device by compression.

With the present invention, a clamping device and method is provided for which a compressive force on an elongate element can be maintained as the diameter of the elongate element reduces. With the present invention the compressive force is the radially inward component of force generated by the reduction in curvature of outwardly curved plates. This result was not possible in previous clamping devices for compressible elongate elements, which clamp elongate elements using circumferential force and friction force only and are dependent upon the axial elasticity of long steel bolts or straps made from titanium or fibre.

With the present invention, a clamping device and method is provided without an outer jacket element. This was not possible in previous clamping devices, which rely upon outer jacket elements to generate clamping force.

When utilizing inner plate members, the inner plate members allow a more even of distribution of the compression force from the outwardly curved plates to the pipe body.

Aptly, the amount of axial constraint of the clamping device may be adjusted by providing additional layers of outwardly curved plates.

Aptly, tapered wing portions allow the bending stress to be kept substantially constant along the profile of the outwardly curved plate as the plate is subject to a bending load due to a change in curvature.

Aptly, the inner support plates 216 may comprise shoe elements of a suitable compliant material, for instance polyurethane, to assist in the transfer of the compressive/clamping load into the pipe body and to spread that load more evenly around the pipe body. The shoe elements may comprise pads of polyurethane similar to those known in the art as parts of caterpuller tracks (caterpullers being the tensioning and holding devices which are used during the manufacture of flexible pipe body and during installation of flexible pipe). The compliance of the shoe elements allows the clamp to follow the curvature of the pipe more easily.

The shoe elements of adjacent segments may be connected, for example with a tie element.

Aptly, the arrangement of and connection between axially adjacent segments allows the clamp itself to comply with a degree of curvature of the pipe under and within the clamp, while still maintaining the clamp position, secured to the pipe body 100. This feature of the present invention is not possible with previously known clamp designs which feature straight sections, rigid and uncompliant, and such designs therefore restrict the possible positioning of a clamp to straight sections of pipe body in the installed pipe configuration.

Aptly, each outwardly curved plate may comprise a plurality of layers of formed strips of material which together react in a similar way to a single, thicker, outwardly curved plate of the type previously described above. With such a plurality of layers, different lengths of formed strip are formed to similar curvatures and bound together as a spring unit, the longest strips innermost to the inside diameter of the curve, and the shortest strips outermost. When a force acts on the ends of the longest strips, attempting to straighten or flatten the curvature from the spring unit, the resistance to the force increases as more and more of the strips comprised in the spring unit resist that flattening force.

Aptly the clamping device may be coated in a suitable material to protect it for the duration of its service life, and/or anodes may be optionally applied to the device to limit or prevent corrosion of the clamp when in the water.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A clamping device for clamping an elongate member, the clamping device comprising:
 a body portion for surrounding the elongate member and configured to apply a compressive force on the elongate member;

wherein the body portion comprises at least two outwardly curved plates;

wherein each of the at least two plates is connected to at least one adjacent plate via at least one connecting element and, when the at least one connecting element is tightened, the curvature of the at least two outwardly curved plates is reduced;

wherein each plate comprises a convex inner surface facing radially inwardly toward the elongate member and a concave outer surface facing radially outwardly away from the elongate member;

wherein the convex inner surface and the concave outer surface are the two largest surfaces of each plate, wherein the at least two outwardly curved plates become pre-stressed to apply the compressive force on the elongate member when the curvature of the plates is reduced as a result of tightening the at least one connecting element, wherein tightening the at least one connecting element reduces the curvatures of the convex inner surface and the concave outer surface of each plate.

2. A clamping device as claimed in claim 1, wherein each of the at least two plates comprises:

a central portion, configured to extend axially along the elongate member; and at least one wing portion configured to extend away from the central portion.

3. A clamping device as claimed in claim 2, wherein the at least one wing portion is tapered, such that the width of the wing portion decreases further from the central portion.

4. A clamping device as claimed in claim 1, wherein the clamping device further comprises a radially inner portion, located radially inwardly of the body portion, wherein the body portion is configured to apply a compressive force on the elongate member via the radially inner portion.

5. A clamping device as claimed in claim 4, wherein the radially inner portion comprises at least two inner plate members.

6. A clamping device as claimed in claim 5, wherein each of the at least two outwardly curved plates is connected to one of the at least two inner plate members.

7. A clamping device as claimed in claim 5, wherein the at least two inner plate members are configured to extend at least partly around the circumference of the elongate member.

8. A clamping device as claimed in claim 1, further comprising at least one tethering element connected to the clamping device, for tethering the radially inner portion and the body portion to a fixed structure.

9. A clamping device as claimed in claim 1, wherein the body portion further comprises at least two further outwardly curved plates, located axially offset along the elongate member from the at least two outwardly curved plates, wherein each of the at least two further outwardly curved plates, is integral with or connected to one of said at least two outwardly curved plates.

10. A clamping device as claimed in claim 1, further comprising at least two outwardly curved support plates, located radially outwardly from the at least two outwardly curved plates.

11. A system for transporting production fluids from a subsea location, comprising an elongate member and a clamping device as claimed in claim 1 clamped onto the elongate member.

12. A method for transporting production fluids from a subsea location, comprising providing an elongate member and a clamping device as claimed in claim 1, and clamping the clamping device onto the elongate member.

13. A clamping device as claimed in claim 1, wherein tightening the at least one connecting element results in no increase in curvature of the at least two outwardly curved plates.

14. A method of assembling a clamping device for clamping an elongate member, comprising the steps of:

surrounding the elongate member with a body portion for applying a compressive force on the elongate member, wherein the body portion comprises at least two outwardly curved plates, wherein each plate comprises a convex inner surface facing radially inwardly toward the elongate member and a concave outer surface facing radially outwardly away from the elongate member, wherein the convex inner surface and the concave outer surface are the two largest surfaces of each plate, wherein each of the at least two plates is connected to at least one adjacent plate via at least one connecting element; and tightening the at least two outwardly curved plates against the elongate member, wherein the step of tightening comprises tightening the at least one connecting element to reduce the curvature of the at least two outwardly curved plates;

wherein the step of tightening causes the at least two outwardly curved plates to become pre-stressed to apply the compressive force on the elongate member when the curvature of the plates is reduced as a result of tightening the at least one connecting element, wherein the step of tightening reduces the curvatures of the convex inner surface and the concave outer surface of each plate.

15. A method of assembling a clamp device as claimed in claim 14, wherein each of the at least two plates comprises:

a central portion, configured to extend axially along the elongate member; and at least one wing portion configured to extend away from the central portion.

16. A method of assembling a clamp device as claimed in claim 15, wherein the at least one wing portion is tapered, such that the width of the wing portion decreases further from the central portion.

17. A method of assembling a clamp device as claimed in claim 14, further comprising providing a radially inner portion, located radially inwardly of the body portion and applying a compressive force on the elongate member via the radially inner portion.

18. A method of assembling a clamp device as claimed in claim 14, wherein the step of tightening results in no increase in curvature of the plates.

* * * * *